(12) United States Patent
Maeda

(10) Patent No.: US 10,254,750 B2
(45) Date of Patent: Apr. 9, 2019

(54) MACHINING MACHINE SYSTEM WHICH DETERMINES ACCEPTANCE/REJECTION OF WORKPIECES

(71) Applicant: FANUC CORPORATION, Yamanashi (JP)

(72) Inventor: Kazuomi Maeda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 111 days.

(21) Appl. No.: 15/466,447

(22) Filed: Mar. 22, 2017

(65) Prior Publication Data

US 2017/0277174 A1 Sep. 28, 2017

(30) Foreign Application Priority Data

Mar. 24, 2016 (JP) ................... 2016-060928

(51) Int. Cl.
*G05B 19/418* (2006.01)

(52) U.S. Cl.
CPC ........... *G05B 19/41875* (2013.01); *G05B 2219/32212* (2013.01); *G05B 2219/32213* (2013.01); *G05B 2219/32368* (2013.01); *G05B 2219/34015* (2013.01); *Y02P 90/22* (2015.11); *Y02P 90/26* (2015.11)

(58) Field of Classification Search
CPC .... G05B 19/41875; G05B 2219/32368; G05B 2219/34015
See application file for complete search history.

(56) References Cited

U.S. PATENT DOCUMENTS

| 5,244,447 A * | 9/1993 | Tanaka .............. G05B 19/4187 483/1 |
| 2002/0173935 A1 | 11/2002 | Miura |
| 2008/0046210 A1 * | 2/2008 | Murakami ............. H05K 13/08 702/82 |

(Continued)

FOREIGN PATENT DOCUMENTS

| CN | 1377756 A | 11/2002 |
| CN | 101098619 A | 1/2008 |

(Continued)

*Primary Examiner* — Yuhui R Pan
(74) *Attorney, Agent, or Firm* — Hauptman Ham, LLP

(57) ABSTRACT

A machining machine system includes: a machining machine; a numerical control device which generates a command for driving an axis of the machining machine; an interior information acquisition unit which acquires interior information of the numerical control device; a tentative determination unit which determines acceptance/rejection of a workpiece as machined by the machining machine based on a comparison result between the interior information and a threshold value; a final determination unit which determines acceptance/rejection of workpieces which are targets of an accuracy inspection which include at least a workpiece as determined to be accepted/rejected by the tentative determination unit based on a measurement result with respect to an accuracy of the workpiece; and a threshold value update unit which updates the threshold value used for determination processing by the tentative determination unit based on determination results by the tentative determination unit and the final determination unit.

14 Claims, 10 Drawing Sheets

(56) References Cited

U.S. PATENT DOCUMENTS

| | | | |
|---|---|---|---|
| 2010/0023307 A1* | 1/2010 | Lee | G05B 23/0254 |
| | | | 703/7 |
| 2011/0246132 A1* | 10/2011 | Sato | B23Q 5/28 |
| | | | 702/150 |
| 2014/0129503 A1* | 5/2014 | Yang | G06N 5/02 |
| | | | 706/46 |

FOREIGN PATENT DOCUMENTS

| | | |
|---|---|---|
| JP | 7-56623 A | 3/1995 |
| JP | 10-26580 A | 1/1998 |
| JP | 10-112599 A | 4/1998 |
| JP | 2002-341909 A | 11/2002 |
| JP | 2006-146459 A | 6/2006 |
| JP | 2008-10666 A | 1/2008 |
| JP | 2010-076177 A | 4/2010 |

\* cited by examiner

MACHINING MACHINE SYSTEM WHICH DETERMINES ACCEPTANCE/REJECTION OF WORKPIECES

RELATED APPLICATIONS

The present application claims priority to Japanese Application Number 2016-060928, filed Mar. 24, 2016, the disclosure of which is hereby incorporated by reference herein in its entirety.

BACKGROUND OF THE INVENTION

1. Field of the Invention

The present invention relates to a machining machine system which determines acceptance/rejection of workpieces.

2. Description of the Related Art

In manufacturing factories, by a machining machine, such as a machine tool, an injection molding machine, or a robot for arc welding, etc., machining and welding an object to be machined (workpiece), etc., are performed. Further, to machine a workpiece, machining machines constitute a manufacturing line, such as a manufacturing cell. In such a case, each machining machine which constitutes the manufacturing cell is controlled by a cell controller via a communication network. The cell controller is managed by a higher-order host controller.

In such a machining machine system, a determination of acceptance/rejection of a workpiece as machined by the machining machines is performed by an inspection with respect to the total number of workpieces or by a sampling inspection.

For example, as disclosed in Japanese Unexamined Patent Publication (Kokai) No. 2006-146459, known is a semiconductor device manufacturing system in which from history data of device log information, abnormality determination threshold values are created, and an abnormality determination of wafer machining processing is performed.

Further, for example, as disclosed in Japanese Unexamined Patent Publication (Kokai) No. 2002-341909, known is a method for a workpiece machining device in which sampling points are set in an operation process, and using a standard deviation of a signal at each of the points, the presence/absence of an abnormality in the operation process is monitored.

Still further, for example, as disclosed in Japanese Unexamined Patent Publication (Kokai) No. 2010-76177, known is an acceptance/rejection determination device which measures a physical quantity of a pressure, a speed, a time, etc., that influence a molded product quality, and sets an upper limit value and a lower limit value to perform an acceptance/rejection determination of a molded product.

When the acceptance/rejection determination of a workpiece as machined by the machining machines is performed with respect to the total number of workpieces, inspection accuracy increases, whereas a large number of steps are necessary and efficiency is poor. On the other hand, when the sampling inspection is performed instead of the total inspection, the number of workpieces which are targets of the acceptance/rejection determination can be reduced, whereas rejects may not be detected.

SUMMARY OF INVENTION

In view of the above problems, it is an object of the present invention to provide a machining machine system capable of preventing a failure to detect rejects while reducing the number of workpieces which are targets of an accuracy inspection.

In order to achieve the object above, a machining machine system includes: a machining machine machines a workpiece by driving an axis by at least one motor; a numerical control device which generates a command for driving the axis of the machining machine based on a machining program; an interior information acquisition unit which acquires interior information of the numerical control device; a tentative determination unit which determines acceptance/rejection of a workpiece as machined by the machining machine based on a comparison result between the interior information acquired by the numerical control device and a threshold value; a final determination unit which determines acceptance/rejection of workpieces which are targets of an accuracy inspection which include at least a workpiece as determined to be accepted/rejected by the tentative determination unit based on a measurement result with respect to an accuracy of the workpiece; and a threshold value update unit which updates the threshold value used for determination processing by the tentative determination unit based on a determination result by the tentative determination unit and a determination result by the final determination unit.

Herein, the machining machine system may further include a measurement device which measures an accuracy of at least a machined shape or a machined surface of a workpiece as machined by the machining machine.

Further, the machining machine system may further include: a communication network which connects sets of manufacturing cells, each set being composed of the machining machine and the numerical control device provided to correspond to the machining machine and at least one of the measurement devices in a manner communicable with each other therebetween; and a cell controller which is communicably connected to the communication network and controls an operation of each manufacturing cell, in which the interior information acquisition unit, the tentative determination unit, the final determination unit, and the threshold value update unit may be disposed in the cell controller.

Still further, the machining machine system may further include a host controller which is communicably connected to the plurality of cell controllers, and records and manages information on a determination result by the tentative determination unit as acquired by each of the cell controllers, information on a determination result by the final determination unit as acquired by each of the cell controllers, and a measurement result on an accuracy of a workpiece as machined by the machining machine as acquired by the measurement device.

Still further, it is also possible that the threshold value update unit sets: a value obtained by multiplying the threshold value as already set by a first coefficient smaller than one and larger than zero is set as the new threshold value when a determination of acceptance is made by the tentative determination unit and all the workpieces which are targets of an accuracy inspection are determined to be accepted by the final determination unit; a value obtained by multiplying the threshold value as already set by a second coefficient smaller than the first coefficient and larger than zero is set as the new threshold value when a determination of acceptance is made by the tentative determination unit and the workpieces which are targets of an accuracy inspection contain that as rejected by the final determination unit; a value obtained by multiplying the threshold value as already set by a third coefficient larger than one is set as the new threshold value when a determination of rejection is made by the tentative determination unit and the workpieces which are targets of an accuracy inspection contain that as accepted by the final determination unit; and the threshold value as already set is maintained when a determination of rejection is made by the tentative determination unit and all the workpieces which are targets of an accuracy inspection are determined to be rejected by the final determination unit.

The machining machine may be a machine which machines a workpiece by driving a rotational axis and a linear axis by the motor, and the interior information may include information on a position deviation which is a difference between a position command to the linear axis and a measured position of the linear axis.

The machining machine may be a machine which machines a workpiece by driving rotational axes and linear axes by the motor, and the interior information may include information on a position deviation of a tool which is a difference between a position command based on the machining program to the tool provided for the rotational axes and the linear axes and a measured position with respect to a position of the tool.

Further, the threshold value used for the determination processing by the tentative determination unit may be set for each of machining target areas of a workpiece machined by the machining machine.

Still further, the interior information may include data obtained by subjecting, to second order integration, high frequency components extracted by allowing a command having a dimension of acceleration generated by the numerical control device to pass through a high pass filter.

Still further, the interior information may include data correlated with information acquired by a sensor provided to the machining machine and a machining position or a machining time.

Still further, the machining machine system may further include a machine learning device including a state observation unit which observes a state variable configured to include interior information acquired by the interior information acquisition unit, a measurement result on an accuracy of a workpiece as machined by the machining machine, information on a determination result by the tentative determination unit, and information on a determination result by the final determination unit, and a learning unit which learns interior information to be acquired by the interior information acquisition unit in accordance with a training data set created based on the state variable.

Herein, as the state variable observed by the state observation unit, a threshold value set by the threshold value update unit and the machining program may be further included.

Further, the machining machine system may further include a decision-making unit which determines interior information to be acquired by the interior information acquisition unit based on a result learned by the learning unit in accordance with a training data set and in response to an input of the current state variable.

Still further, the learning unit may include: a reward calculation unit which calculates a reward based on information on a determination result by the tentative determination unit and information on a determination result by the final determination unit, and a function update unit which updates a function for selecting interior information to be acquired by the interior information acquisition unit based on the state variable and the reward.

Still further, the reward calculation unit may be configured to increase the reward when a determination of acceptance is made by the tentative determination unit and all workpieces which are targets of an accuracy inspection are determined to be accepted by the final determination unit, and when a determination of rejection is made by the tentative determination unit and all workpieces which are targets of an accuracy inspection are determined to be rejected by the final determination unit, and decrease the reward when a determination of acceptance is made by the tentative determination unit and workpieces which are targets of an accuracy inspection contain that as rejected by the final determination unit, and when a determination of rejection is made by the tentative determination unit and workpieces which are targets of an accuracy inspection contain that as accepted by the final determination unit.

BRIEF DESCRIPTION OF THE DRAWINGS

The present invention will be more clearly understood with reference to the following accompanying drawings.

DETAILED DESCRIPTION

A machining machine system which determines acceptance/rejection of workpieces will be described below with reference to the drawings. However, it should be understood that the present invention is not limited to the drawings or embodiments described below.

Figure 1:
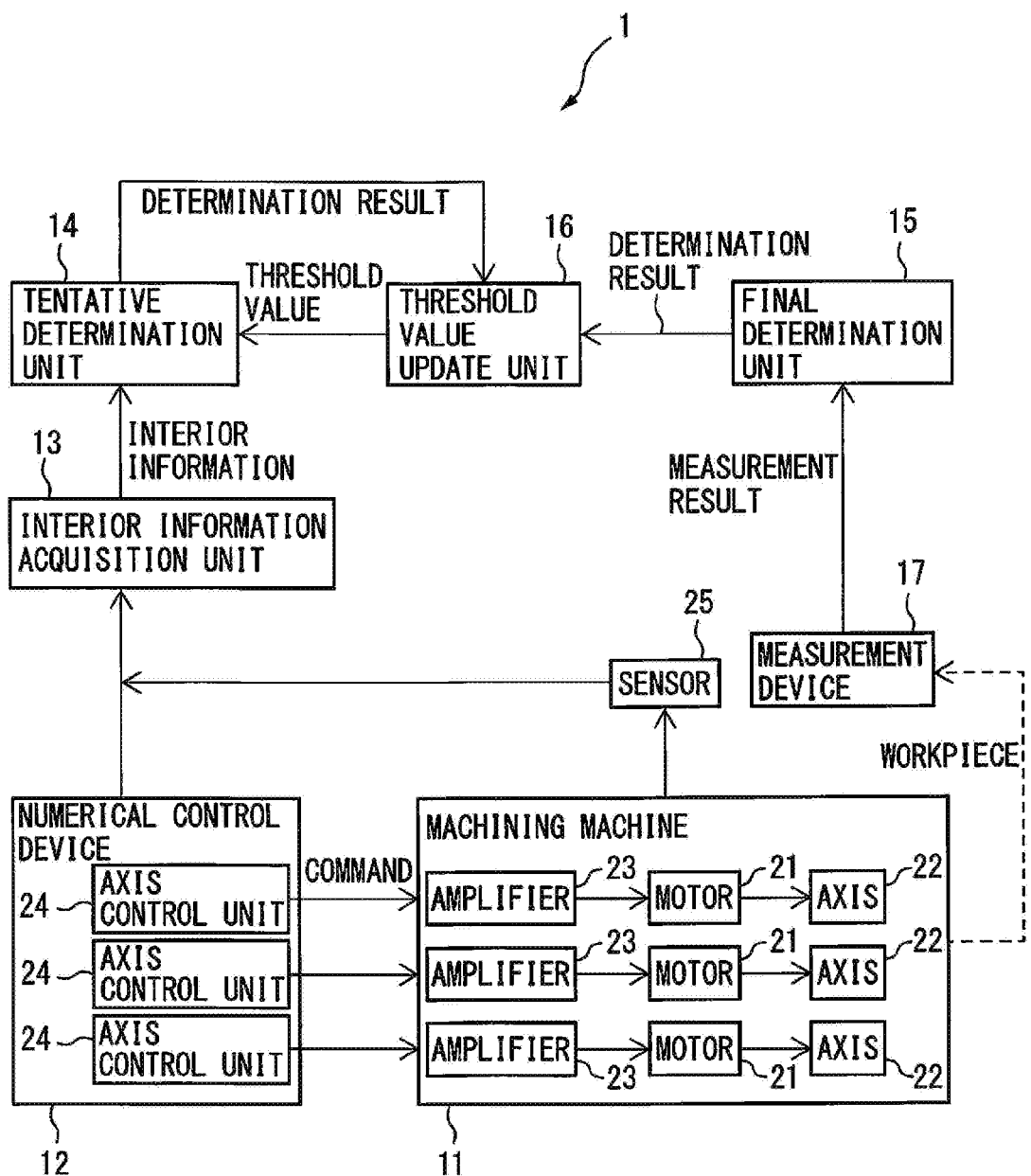
FIG. 1 is a principle block diagram of a machining machine system according to a first embodiment.
Figure 2:
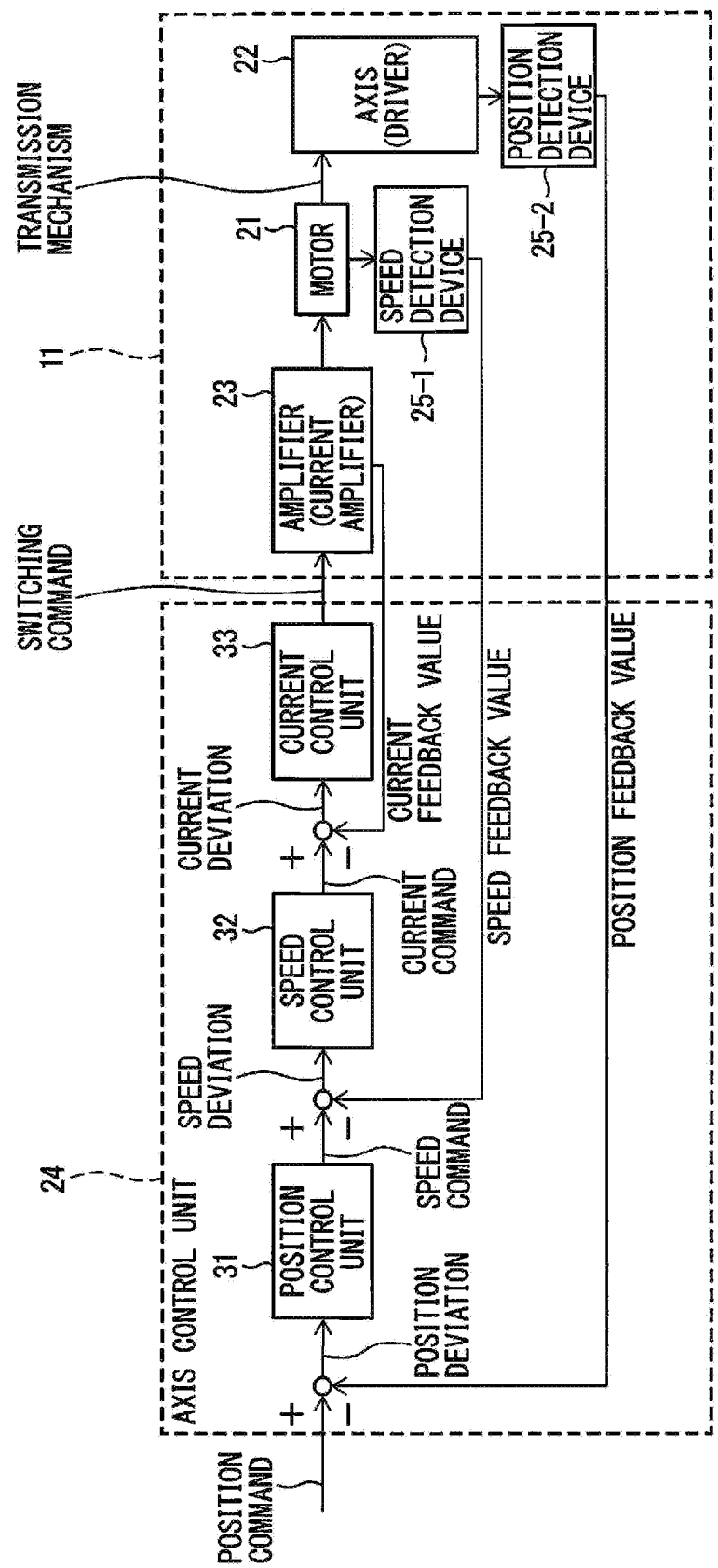
FIG. 2 is a block diagram illustrating a configuration of an axis control unit in a numerical control device and a machining machine connected to the numerical control device.

FIG. 1 is a principle block diagram of a machining machine system according to a first embodiment. Further, FIG. 2 is a block diagram illustrating a configuration of an axis control unit in a numerical control device and a machining machine connected to the numerical control device. Hereinafter, components assigned identical reference numerals in different drawings have identical functions. To facilitate understanding, these drawings are suitably changed in scale. In addition, the embodiments illustrated in the drawings are an example for carrying out the present invention, and the present invention is not limited to the embodiments as illustrated.

A machining machine system 1 according to the first embodiment includes a machining machine 11, a numerical control device 12, an interior information acquisition unit 13, a tentative determination unit 14, a final determination unit 15, and a threshold value update unit 16. Moreover, the machining machine system 1 further includes a measurement device 17 which measures an accuracy of at least a machined shape or a machined surface of a workpiece as machined by the machining machine 11. In the present embodiment, the tentative determination unit 14 tentatively performs an acceptance/rejection determination of a workpiece as machined by the machining machine 11 based on a comparison result between interior information of the numerical control device 12 and a threshold value set by the threshold value update unit 16, and the final determination unit 15 performs a final acceptance/rejection determination of workpieces which are targets of an accuracy inspection which include at least a workpiece as determined to be rejected by the tentative determination unit 14 based on a measurement result with respect to an accuracy of the workpiece, thereby preventing a failure to detect rejects while reducing the number of workpieces which are targets of an accuracy inspection.

The machining machine 11 is configured to machine an object to be machined (workpiece) by driving an axis (driver) 22 by a motor 21. As an example of the machining machine 11, there are an NC machine tool, an injection molding machine, an industrial robot for arc welding, etc., a PLC, a conveyor, a measurement device, a test device, a press, an injector, a printing machine, a die casting machine, a food machine, a packing machine, a welding machine, a washing machine, a coating machine, an assembly device, a mounting machine, a woodworking machine, a sealing machine, or a cutting machine, but a type of the machining machine 11 itself is not to particularly limit the present invention.

The machining machine 11 is provided with at least one axis (driver) 22 to which a tool, an object to be machined (workpiece), or the like is mounted according to purposes. For example, when the machining machine 11 is a lathe, a linear axis and a rotational axis are combined to be provided, and when the machining machine 11 is a machining center, as the axis 22, a configuration is made in such a manner that linear axes and rotational axes are combined. Note that in the example as illustrated, by way of example, the number of axes 22 is three, but the number of axes 22 itself is not to limit the present invention. In general, corresponding to one axis 22, one motor 21 and one amplifier 23 are provided.

The motor 21 in the machining machine 11 is used as a drive source of the axis (driver) 22 to which a tool, an object to be machined (workpiece), or the like is mounted, and linearly or rotationally drives the axis 22 in accordance with a power transmission mechanism between the motor 21 and the axis 22. Note that a type and a configuration of the motor 21 are not to limit the present invention, and an alternating current motor, such as an induction motor and a synchronous motor, or a direct current motor may be suitable. Drive power of the motor 21 is supplied by the amplifier 23.

The amplifier 23 in the machining machine 11 is a current amplifier which generates drive power for supplying drive power to the motor 21 based on a command generated by the numerical control device 12 as described below, and is configured, for example, by a power inverter (inverter) made of a full bridge circuit of a semiconductor switching element. In accordance with a switching command generated by an axis control unit 24 in the numerical control device 12, the switching element in the amplifier 23 is turned on and off, whereby the amplifier 23 converts direct current power to desired alternating current power and supplies the same to the motor 21. A type and a configuration of the amplifier 23 are not to particularly limit the present invention.

The machining machine 11 is provided with a sensor 25 for acquiring various types of sensor information, such as information on a speed of the motor 21, a temperature at each point of the machining machine 11 including the motor 21, a position of the axis 22, or vibrations, noises, a humidity or an image generated in the machining machine 11. As an example of the sensor 25, there are a speed detection device 25-1 for detecting the speed of the motor 21, a temperature detection device (unillustrated) for detecting the temperature at each point of the machining machine 11 including the motor 21, a position detection device 25-2 for detecting the position of the axis 22, a vibration sensor (unillustrated) for detecting the vibrations, an acoustic sensor (unillustrated) for detecting the noises, a humidity sensor (unillustrated) for detecting the humidity, a CCD camera (unillustrated) for detecting the image, etc.

The measurement device 17 measures an accuracy of at least a machined shape or a machined surface of a workpiece as machined by the machining machine 11. A type and a configuration of the measurement device 17 are not to particularly limit the present invention, but for example, using an optical or electronic method, an accuracy of a machined shape or a machined surface of a workpiece is measured. A measurement result by the measurement device 17 is transmitted to the final determination unit 15.

The numerical control device 12 includes the axis control unit 24 which generates a command for driving the axis 22 of the machining machine 11 based on a predetermined machining program. The axis control unit 24 is provided to correspond to the amplifier 23 in the machining machine 11. In FIG. 2, a case in which the number of axis control units 24 is one is illustrated, but when the number of axes 22 in the machining machine 11 is plural, the axis control units 24 are provided in such a manner that the number thereof corresponds to such number. The machining program is information in which command processing for the machining machine 11 to perform a predetermined operation is programmed. For example, in a case of an articulated robot, the machining program includes information, such as an operation command for moving an arm portion to an operation position, a command to communicate an optional signal to the exterior, a command to read a state of an optional signal, etc. Further, the machining program also includes position information of an operation position and numbers of operational signals. As a matter of course, any command which can be registered on the program may be suitable. In other words, the present invention is not limited to the programming information described herein by way of example.

The axis control unit 24 includes a position control unit 31, a speed control unit 32, and a current control unit 33. The position control unit 31 generates a speed command based on a position deviation which is a difference between a position command based on the machining program received from the control device as described above (for example, a cell controller 19 or a host controller 100 as described below) and a position feedback value that is the measured position of the axis 22 as measured by the position detection device 25-2. The speed control unit 32 generates a current command (torque command) based on a speed deviation which is a difference between the speed command received from the position control unit 31 and a speed feedback value that is the speed of the motor 21 as measured by the speed detection device 25-1. The current control unit 33 generates the switching command for on/off controlling the switching element in the amplifier 23 based on a current deviation which is a difference between the current command received from the speed control unit 32 and a current feedback value that is a current flowing from the amplifier 23 to the motor 21 as measured by a current detection device (unillustrated). For example, when the amplifier 23 is a PWM control type inverter, the switching command generated by the current control unit 33 is a PWM command. Thus, in the amplifier 23, in accordance with the switching command generated by the axis control unit 24, the switching element in the amplifier 23 is turned on and off, whereby the amplifier 23 converts direct current power to desired alternating current power and supplies the same to the motor 21.

The interior information acquisition unit 13 acquires the interior information used for determination processing in the tentative determination unit 14 from the numerical control device 12.

The interior information acquired by the interior information acquisition unit 13 is information which is used for calculation in a calculation processing device (unillustrated) in the machining machine 11, or stored in a memory (unillustrated) in the machining machine 11, or acquired by the sensor 25 provided to the machining machine 11, and includes, for example, data on a position deviation which is a difference between the position command and the measured position, load data, various types of sensor information, etc.

The interior information on a position deviation which is a difference between the position command and the measured position includes, for example, two features. For example, when the machining machine 11 is a machine, such as a lathe which machines a workpiece by driving a rotational axis and a linear axis by the motor 21, a position deviation which is a difference between the position command to the linear axis and the measured position with respect to the linear axis influences a shape accuracy of a workpiece, and thus information on such position deviation is used as the interior information. Further, for example, when the machining machine 11 is a machine, such as a machining center which machines a workpiece by driving rotational axes and linear axes by the motor 21, a positional relationship between a tip end of a tool which performs machining and a workpiece determines a shape accuracy, and thus information on a position deviation of the tool which is a difference between the position command based on the machining program to the tool provided for the rotational axes and the linear axes and the measured position with respect to a position of the tool is used as the interior information.

In addition to the interior information on a position deviation, the following interior information can be illustrated by way of example.

For example, it is commonly known that when image data obtained by capturing an image of a machined surface of a workpiece is analyzed, a machined surface roughness of the workpiece has high frequency components. Then, in the present embodiment, a machined surface roughness of a workpiece is assumed to be caused by a command having a dimension of acceleration generated by the numerical control device 12, such as the torque command and the current command, and data having a dimension of position obtained by allowing the command having a dimension of acceleration generated by the numerical control device 12 to pass through a high pass filter to thereby extract high frequency components, and subjecting the high frequency components to second order integration (data without drift components and corresponding to a surface roughness) may be used as the interior information. When the determination processing of the tentative determination unit 14 is performed using such interior information, a determination result with respect to a surface accuracy in the final determination unit 15 can be efficiently estimated.

Further, for example, data correlated with information acquired by the sensor 25 provided to the machining machine 11 and a machining position or a machining time of a workpiece may be used as the interior information. For example, it is known that a temperature of the motor 21 influences a shape accuracy of a workpiece, and vibrations and noises generated by the machining machine 11 influence a surface accuracy of a workpiece, and temperature information, vibration information, image information, and acoustic information may be included in the interior information. When the determination processing of the tentative determination unit 14 is performed using the information acquired by the sensor 25, a determination result with respect to a surface accuracy in the final determination unit 15 can be efficiently estimated.

Still further, for example, the current command (torque command) generated by the speed control unit 32 provided to the axis control unit 24 in the numerical control device 12, the speed feedback value acquired by the speed detection device 25-1, the current feedback value which is a current flowing from the amplifier 23 to the motor 21 as measured by a current detection device (unillustrated), etc., may be included in the interior information. Still further, for example, the machining program used in the machining machine 11 may be included in the interior information.

As described above, the interior information may be of plural types, and such interior information is acquired by the interior information acquisition unit 13 while correlated with numbers discriminating a workpiece machined by the machining machine 11 (hereinafter referred to as "workpiece discrimination numbers"), and is transmitted to the tentative determination unit 14.

Returning to the description on a configuration of the machining machine system 1 of FIG. 1, the tentative determination unit 14 determines acceptance/rejection of a workpiece as machined by the machining machine 11 based on a comparison result between the interior information acquired by the interior information acquisition unit 13 and the threshold value set by the threshold value update unit 16. A determination result by the tentative determination unit 14 is transmitted to the threshold value update unit 16.

The final determination unit 15 determines acceptance/rejection of workpieces which are targets of an accuracy inspection which include at least a workpiece as determined to be accepted/rejected by the tentative determination unit 14 based on a measurement result with respect to an accuracy of the workpiece. The accuracy of the workpiece has been measured by the measurement device 17, and relates to an accuracy of at least a machined shape or a machined surface. The workpieces which are targets of an accuracy inspection may be suitable as long as at least a workpiece as determined to be accepted/rejected by the tentative determination unit 14 is included, and for example, when the number of workpieces as determined to be accepted/rejected is 10, it is sufficient when the workpieces which are targets of an accuracy inspection are the 10 pieces of workpieces as determined to be accepted/rejected themselves, or the total number thereof is no less than 11, including the 10 pieces of workpieces as determined to be accepted/rejected. A determination result by the final determination unit 15 is transmitted to the threshold value update unit 16.

The threshold value update unit 16 updates the threshold value used for the determination processing by the tentative determination unit 14 based on the determination result by the tentative determination unit 14 and the determination result by the final determination unit 15. In the threshold value, an upper limit threshold value and a lower limit threshold value are set. In other words, when the interior information falls between the upper limit threshold value and the lower limit threshold value, the tentative determination unit 14 determines that "a workpiece is accepted", and when the interior information exceeds the upper limit threshold value and falls below the lower limit threshold value, the tentative determination unit 14 determines that "a workpiece is rejected".

The threshold value is set for the interior information which is used for the determination processing by the tentative determination unit 14 and acquired by the interior information acquisition unit 13. For example, when the interior information is information on a position deviation which is a difference between the position command to the linear axis and the measured position with respect to the linear axis, the threshold value corresponding to such position deviation is set, and when the interior information is information on a position deviation of the tool which is a difference between the position command based on the machining program to the tool provided for the rotational axes and the linear axes and the measured position with respect to a position of the tool, the threshold value corresponding to such position deviation is set. In such a case, because a required accuracy is different with respect to each machining target area of a workpiece machined by the machining machine 11, the threshold value used for the determination processing by the tentative determination unit 14 is set for each machining target area of a workpiece machined by the machining machine 11. With respect to the interior information on the data having a dimension of position obtained by allowing the command having a dimension of acceleration generated by the numerical control device 12 to pass through a high pass filter to thereby extract high frequency components, and subjecting the high frequency components to second order integration, the threshold value corresponding thereto is set. Similarly, with respect to the interior information on the temperature information, the vibration information, and the acoustic information, the threshold value corresponding thereto is set. The threshold value corresponding to the interior information suitably updated by the threshold value update unit 16 based on the determination result by the tentative determination unit 14 and the determination result by the final determination unit 15. The threshold value as set (updated) by the threshold value update unit 16 is transmitted to the tentative determination unit 14. The details of threshold value update processing by the threshold value update unit 16 will be described later.

Note that the interior information acquisition unit 13, the tentative determination unit 14, the final determination unit 15, and the threshold value update unit 16 as described above may be constructed using a software program format or using a combination of various types of electronic circuits and a software program. For example, when these are constructed using a software program format, the calculation processing device in the machining machine system 1 is allowed to operate in accordance with the software program, whereby a function of each unit as described above can be realized. Further, alternatively, the interior information acquisition unit 13, the tentative determination unit 14, the final determination unit 15, and the threshold value update unit 16 may be realized as a semiconductor integrated circuit in which a software program which realizes a function of each unit is written.

Figure 3:
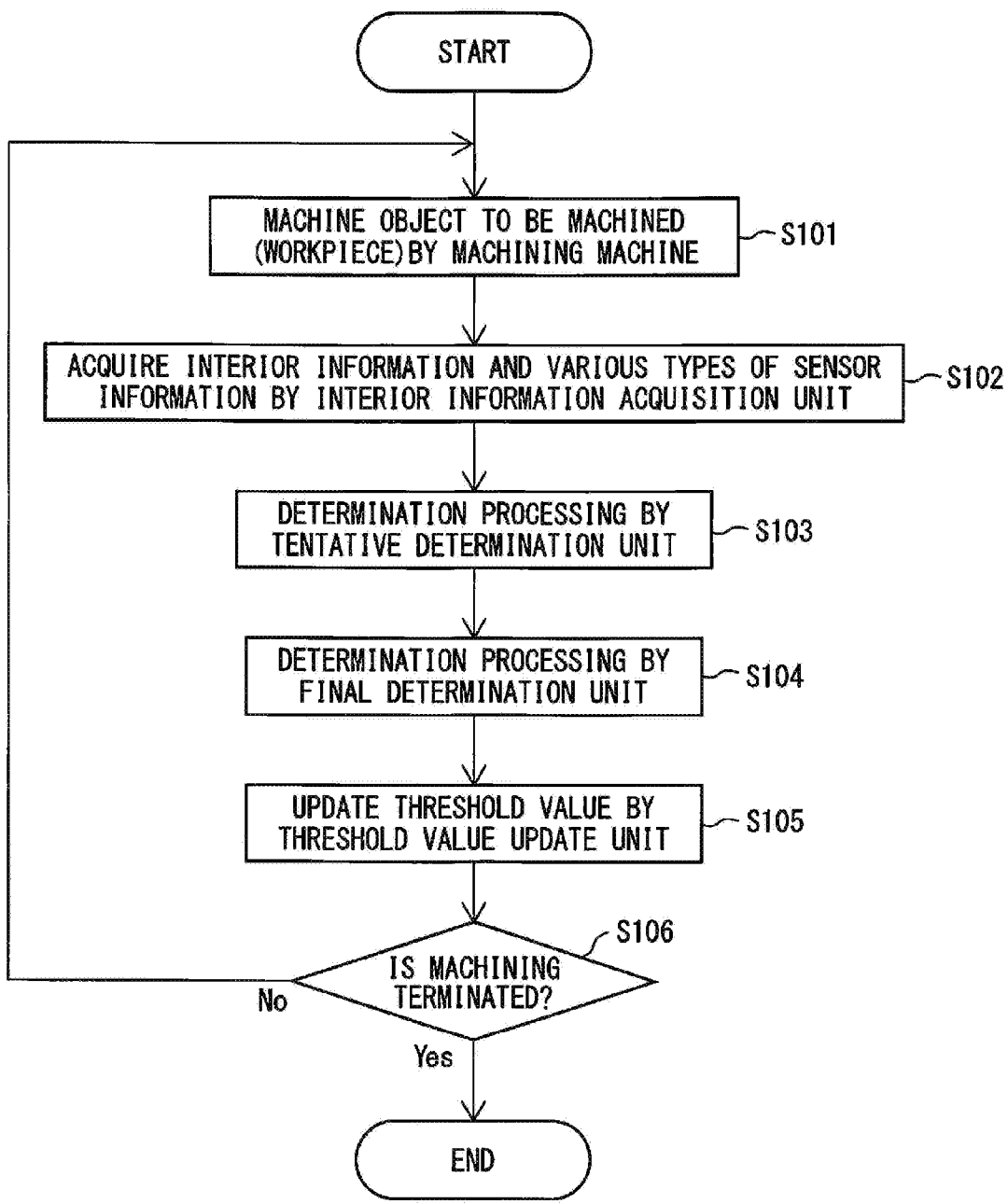
FIG. 3 is a flowchart illustrating an operation flow of the machining machine system according to the first embodiment.

Next, an operation principle of the machining machine system 1 according to the present embodiment will be described. FIG. 3 is a flowchart illustrating an operation flow of the machining machine system according to the first embodiment.

In step S101, the machining machine 11 machines an object to be machined (workpiece) by driving the motor 21 by supplying power from the amplifier 23 based on a command generated by the numerical control device 12 and by driving the axis 22 to which a tool, an object to be machined (workpiece), or the like is mounted according to purposes.

In step S102, the interior information acquisition unit 13 acquires the interior information from the numerical control device 12 and various types of sensor information as the interior information from the sensor 25 during a machining period of a workpiece by the machining machine 11.

In step S103, the tentative determination unit 14 compares the interior information acquired by the interior information acquisition unit 13 and the threshold value set by the threshold value update unit 16, and based on such comparison result, determines acceptance/rejection of a workpiece as machined by the machining machine 11. A determination result by the tentative determination unit 14 is transmitted to the threshold value update unit 16. The details of the determination processing by the tentative determination unit 14 in step S103 will be described below.

In step S104, the final determination unit 15 determines acceptance/rejection of workpieces which are targets of an accuracy inspection which include at least a workpiece as determined to be accepted/rejected by the tentative determination unit 14 based on a measurement result with respect to an accuracy of the workpiece by the measurement device 17. A determination result by the final determination unit 15 is transmitted to the threshold value update unit 16.

In step S105, the threshold value update unit 16 updates the threshold value used for the determination processing by the tentative determination unit 14 in step S103 based on the determination result by the tentative determination unit 14 in step S103 and the determination result by the final determination unit 15 in step S104. The threshold value set by the threshold value update unit 16 is transmitted to the tentative determination unit 14. The details of the threshold value update processing by the threshold value update unit 16 in step S105 will be described below.

In step S106, it is determined whether or not machining of a workpiece by the machining machine 11 is terminated. Since the machining machine 11 operates based on a command received from the numerical control device 12, machining is terminated when a command to terminate machining from the numerical control device 12 is received. It is common that the command to terminate machining from the numerical control device 12 is, for example, specified in the machining program, or outputted by a predetermined operation by the operator, or outputted when an abnormality, such as a power failure, is detected, and the content of processing itself in step S106 is not to particularly limit the present invention. When it is determined that machining of a workpiece by the machining machine 11 is terminated in step 106, a return to step S101 is made, and machining of a workpiece by the machining machine 11 is continued.

The details of the determination processing by the tentative determination unit 14 in step S103, determination processing by the final determination unit 15 in step S104, and the threshold value update processing by the threshold value update unit 16 in step S105 will be described.

Figure 4:
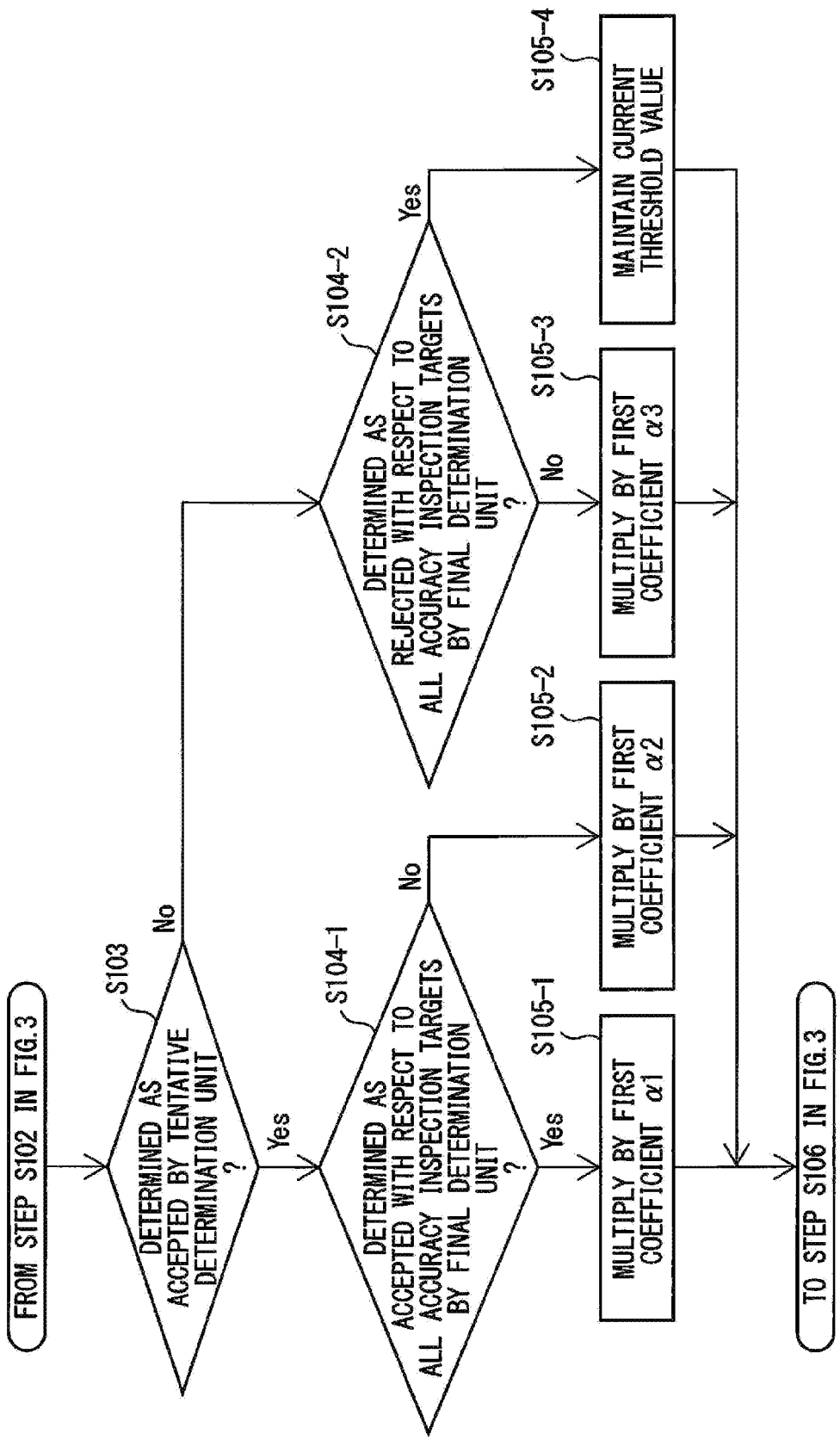
FIG. 4 is a flowchart illustrating an operation flow of determination processing by a tentative determination unit, determination processing by a final determination unit, and threshold value update processing by a threshold value update unit as illustrated in FIG. 3.

FIG. 4 is a flowchart illustrating an operation flow of the determination processing by the tentative determination unit, the determination processing by the final determination unit, and the threshold value update processing by the threshold value update unit as illustrated in FIG. 3.

In step S103, the tentative determination unit 14 compares the interior information acquired by the interior information acquisition unit 13 and the threshold value set by the threshold value update unit 16, and based on such comparison result, determines acceptance/rejection of a workpiece as machined by the machining machine 11. As described above, the threshold value is that set for the interior information acquired by the interior information acquisition unit 13. For example, when the interior information is that on a position deviation which is a difference between the position command and the measured position, when the position deviation which is the interior information falls between the upper limit threshold value and the lower limit threshold value, a determination as "a workpiece is accepted" is made, and when the position deviation exceeds the upper limit threshold value and falls below the lower limit threshold value, a determination as "a workpiece is rejected" is made. Further, for example, when the interior information is that on the data having a dimension of position obtained by allowing the command having a dimension of acceleration generated by the numerical control device 12 to pass through a high pass filter to thereby extract high frequency components, and subjecting the high frequency components to second order integration (data without drift components and corresponding to a surface roughness), when the interior information falls within a range between the upper limit threshold value and the lower limit threshold value, a machined surface roughness of a workpiece is determined to be "accepted", and determined in the other cases that "a workpiece is rejected". Also, with respect to the interior information which is the temperature information, the vibration information, and the acoustic information, the acceptance/rejection determination is similarly made.

In step S103, when a determination as "a workpiece is accepted" is made by the tentative determination unit 14, an advance to step S104-1 is made, and when a determination as "a workpiece is rejected" is made, an advance to step S104-2 is made.

In step S104-1, the final determination unit 15 determines whether all workpieces which are targets of an accuracy inspection which include at least a workpiece as determined to be accepted/rejected by the tentative determination unit 14 are accepted based on a measurement result with respect to an accuracy of the workpiece by the measurement device 17. In step S104-1, when the final determination unit 15 determines that "all workpieces which are targets of an accuracy inspection are accepted", an advance to step S105-1 is made. On the other hand, in step S104-1, when the final determination unit 15 fails to determine that "all workpieces which are targets of an accuracy inspection are accepted", it is meant that "workpieces which are targets of an accuracy inspection contain that to be rejected", and in such a case, an advance to step S105-2 is made.

Similarly, in step S104-2, the final determination unit 15 determines whether all workpieces which are targets of an accuracy inspection which include at least a workpiece as determined to be accepted/rejected by the tentative determination unit 14 are rejected based on a measurement result with respect to an accuracy of the workpiece by the measurement device 17. In step S104-2, when the final determination unit 15 fails to determine that "all workpieces which are targets of an accuracy inspection are rejected", it is meant that "workpieces which are targets of an accuracy inspection contain that to be accepted", and an advance to step S105-3 is made. On the other hand, in step S104-2, when the final determination unit 15 determines that "all workpieces which are targets of an accuracy inspection are rejected", an advance to step S105-4 is made.

Step S105-1 is executed by the threshold value update unit 16 when a determination of acceptance is made by the tentative determination unit 14 in step S103 and all workpieces which are targets of an accuracy inspection are determined to be accepted by the final determination unit 15 in step S104-1. In such a case, because the determination result by the tentative determination unit 14 and the determination result by the final determination unit 15 correspond to each other, and reducing the threshold value as already set by the threshold value update unit 16 to a smaller value allows an estimation efficiency to be improved, a value obtained by multiplying the threshold value as already set by a first coefficient $\alpha_1$ smaller than one and larger than zero is set as the new threshold value.

Step S105-2 is executed by the threshold value update unit 16 when a determination of acceptance is made by the tentative determination unit 14 in step S103 and workpieces which are targets of an accuracy inspection contain that as rejected by the final determination unit 15 in step S104-1. In such a case, because the determination result by the tentative determination unit 14 and the determination result by the final determination unit 15 do not correspond to each other, and the threshold value as used for the determination processing by the tentative determination unit 14 allows workpieces which are targets of an accuracy inspection to contain that as rejected by the final determination unit 15, a value obtained by multiplying the threshold value as already set by a second coefficient $\alpha_2$ smaller than the first coefficient $\alpha_1$ and larger than zero is set as the new threshold value.

Step S105-3 is executed by the threshold value update unit 16 when a determination of rejection is made by the tentative determination unit 14 in step S103 and workpieces which are targets of an accuracy inspection contain that as accepted by the final determination unit 15 in step S104-2. In such a case, it is meant that although there is a workpiece as determined to be rejected by the tentative determination unit 14, workpieces which are targets of an accuracy inspection contain that as accepted by the final determination unit 15, and in other words, the threshold value as used for the determination processing by the tentative determination unit 14 causes an erroneous determination that a workpiece to be originally accepted is also rejected. Then, in such a case, to change the threshold value as already set by the threshold value update unit 16 to a larger value, a value obtained by multiplying the threshold value as already set by a third coefficient $\alpha_3$ larger than one is set as the new threshold value.

Step S105-4 is executed by the threshold value update unit 16 when a determination of rejection is made by the tentative determination unit 14 in step S103 and all workpieces which are targets of an accuracy inspection are determined to be rejected by the final determination unit 15 in step S104-2. In such a case, the determination result by the tentative determination unit 14 and the determination result by the final determination unit 15 correspond to each other so that the threshold value as already set is maintained.

Thus, the threshold value update unit 16 multiplies the threshold value as already set by the coefficients in which a relation of $0<\alpha_2<\alpha_1<1<\alpha_3$ holds, depending on whether or not the determination result by the tentative determination unit 14 and the determination result by the final determination unit 15 correspond to each other. After any processing of steps S105-1 to S105-4, an advance to step S106 in FIG. 3 is made. Until it is determined in step S106 that machining of a workpiece by the machining machine 11 is terminated, the threshold value update processing by the threshold value update unit 16 is repeatedly performed. By such repeated processing, such threshold value is suitably set that the determination result by the tentative determination unit 14 and the determination result by the final determination unit 15 correspond to each other as much as possible. When an accuracy in which the determination result by the tentative determination unit 14 and the determination result by the final determination unit 15 correspond to each other is improved, a failure to detect rejects can be prevented while the number of objects to be machined (workpieces) which are targets of an accuracy inspection can be reduced.

Figure 5:
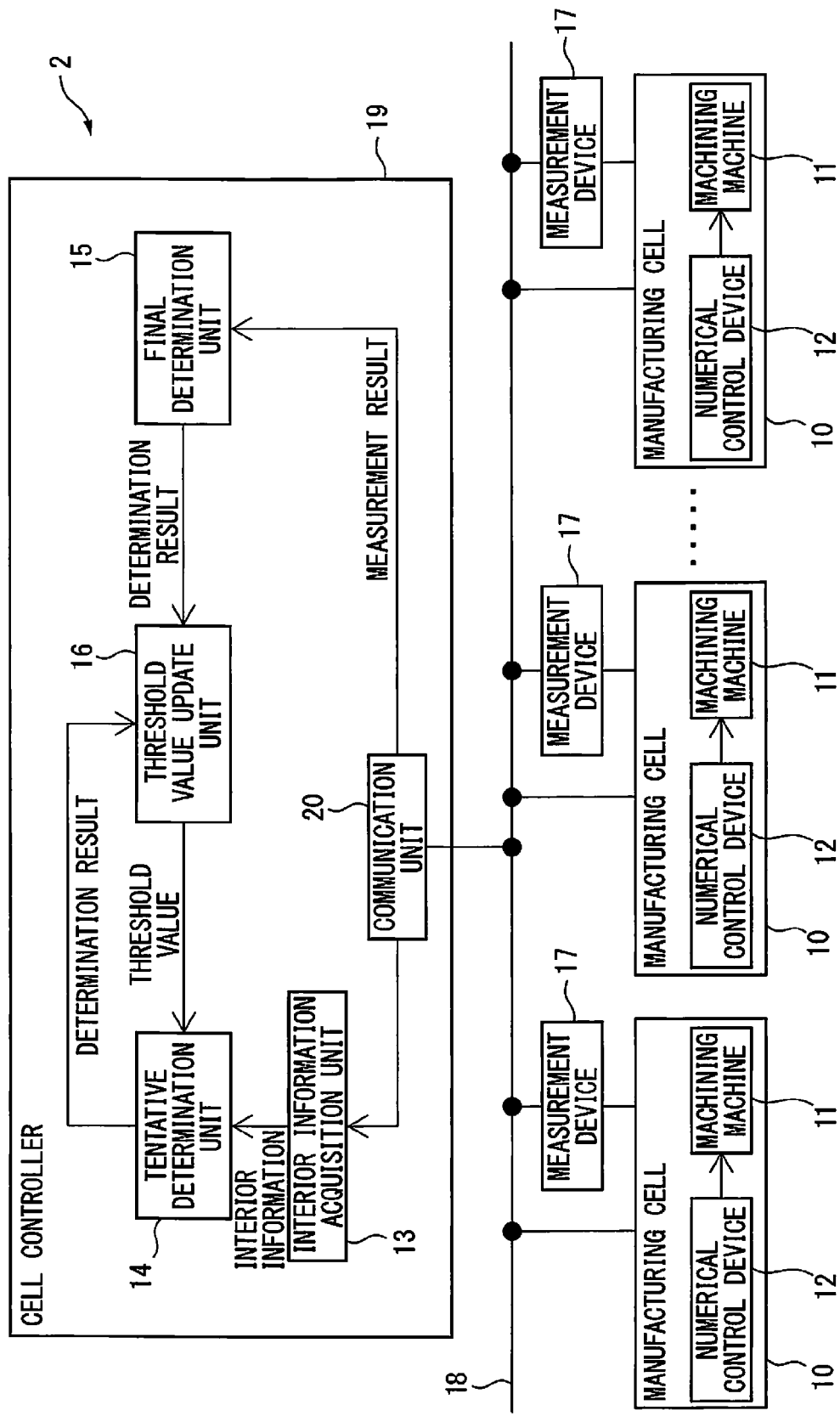
FIG. 5 is a principle block diagram of a machining machine system according to a second embodiment.

Next, a second embodiment will be described. FIG. 5 is a principle block diagram of a machining machine system according to the second embodiment. A machining machine system 2 according to the second embodiment is configured as a cell manufacturing system which includes sets of manufacturing cells 10 composed of the machining machine 11 and the numerical control device 12 provided to correspond thereto according to the first embodiment.

As illustrated in FIG. 5, the machining machine system 2 according to the second embodiment further includes a communication network 18 which connects the plurality of manufacturing cells 10 and at least one measurement device 17 in a manner communicable with each other therebetween, and a cell controller 19 which is communicably connected to the communication network 18 and controls an operation of each manufacturing cell 10. In the machining machine system 2 according to the present embodiment, the interior information acquisition unit 13, the tentative determination unit 14, the final determination unit 15, and the threshold value update unit 16 are disposed in the cell controller 19.

The manufacturing cells 10 and the cell controller 19 are communicably connected to each other via the network 18, such as intranet. The interior information acquisition unit 13 in the cell controller 19 acquires the interior information via the network 18 from the numerical control device 12 in each manufacturing cell 10. Further, the final determination unit 15 in the cell controller 19 acquires a measurement result with respect to an accuracy of a workpiece a machined by the machining machine 11 in each manufacturing cell 10 via the network 18 from the measurement device 17 connected to each manufacturing cell 10. Accordingly, the cell controller 19 includes a communication unit 20 as a communication interface with the network 18.

The manufacturing cells 10 are a set in which the plurality of machining machines 11 which manufacture a product are flexibly combined. The manufacturing cells 10 are constructed by the plural number of or plural types of machining machines 11, such as various types of machine tools and robots, but the number of machining machines 11 in the manufacturing cells 10 is not restricted. For example, the manufacturing cells 10 may be a manufacturing line in which a workpiece is serially which are targets of processing by the plurality of machining machines 11 to thereby become a final product. Further, for example, the manufacturing cells 10 may be a manufacturing line in which two or more workpieces (components) as processed by each of two or more machining machines 11 are combined hallway of a manufacturing process by another machining machine 11, thereby finishing a final workpiece (product). Further, for example, a final workpiece (product) may be finished by combining two or more workpieces as processed by two or more manufacturing cells 10.

The manufacturing cells 10 are disposed in a factory which manufactures products. On the other hand, the cell controller 19 may be disposed in the factory in which the manufacturing cells 10 are disposed, or may be disposed in a building different from the factory. For example, the cell controller 19 may be disposed in a separate building located on a side of the factory in which the manufacturing cells 10 are disposed.

In the machining machine system 2, since components other than those as described above are similar to the components as described with reference to FIGS. 1 to 4, identical components are assigned identical reference numerals, and detailed description thereof is omitted.

According to the second embodiment as described above, the interior information acquisition unit 13, the tentative determination unit 14, the final determination unit 15, and the threshold value update unit 16 are not separately disposed for each manufacturing cell 10 but collectively disposed in the cell controller 19 so that enlargement of the system can be prevented while running costs and processing burdens of each manufacturing cell 10 can be reduced.

Figure 6:
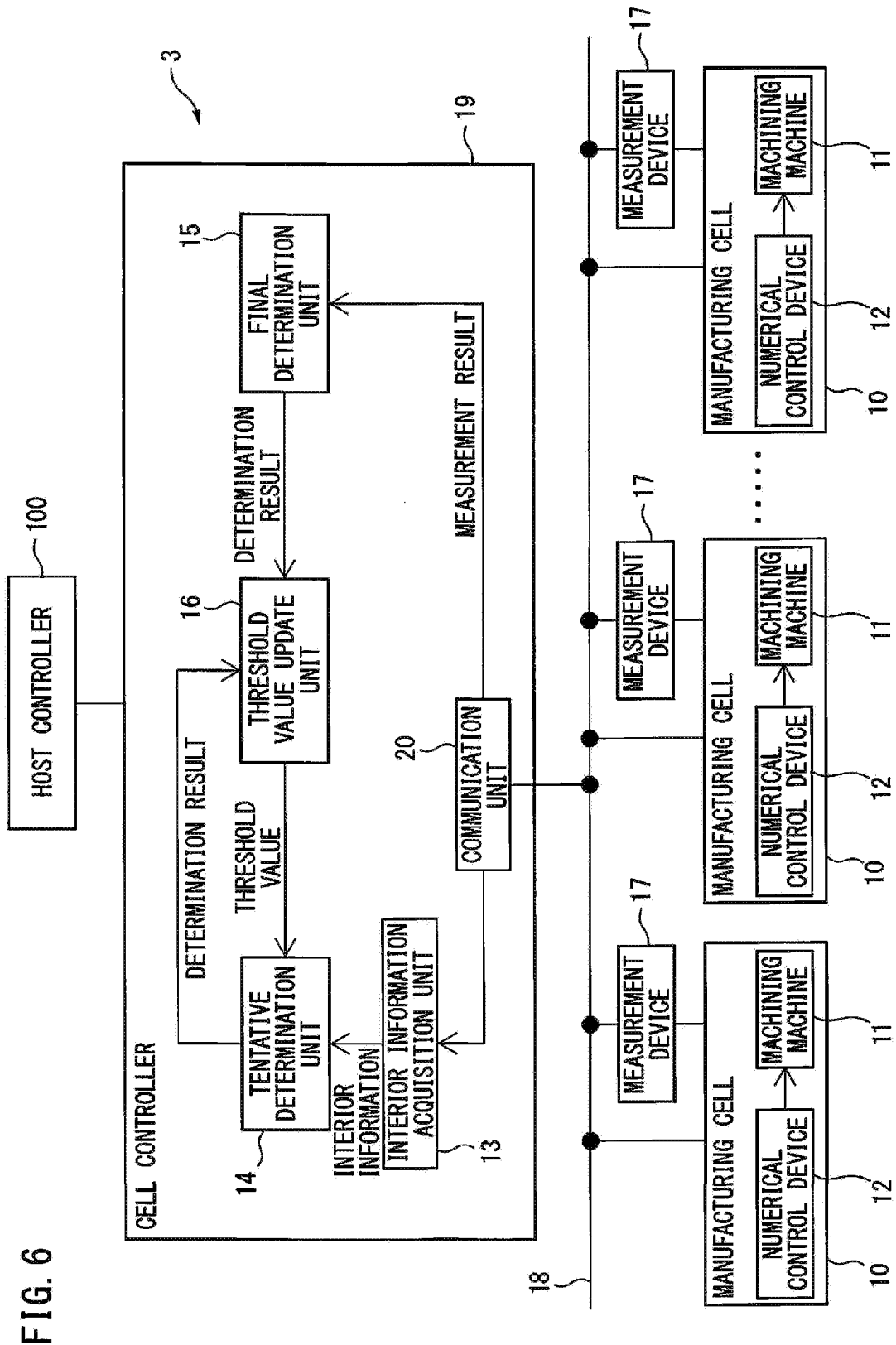
FIG. 6 is a principle block diagram (No. 1) of a machining machine system according to a third embodiment.
Figure 7:
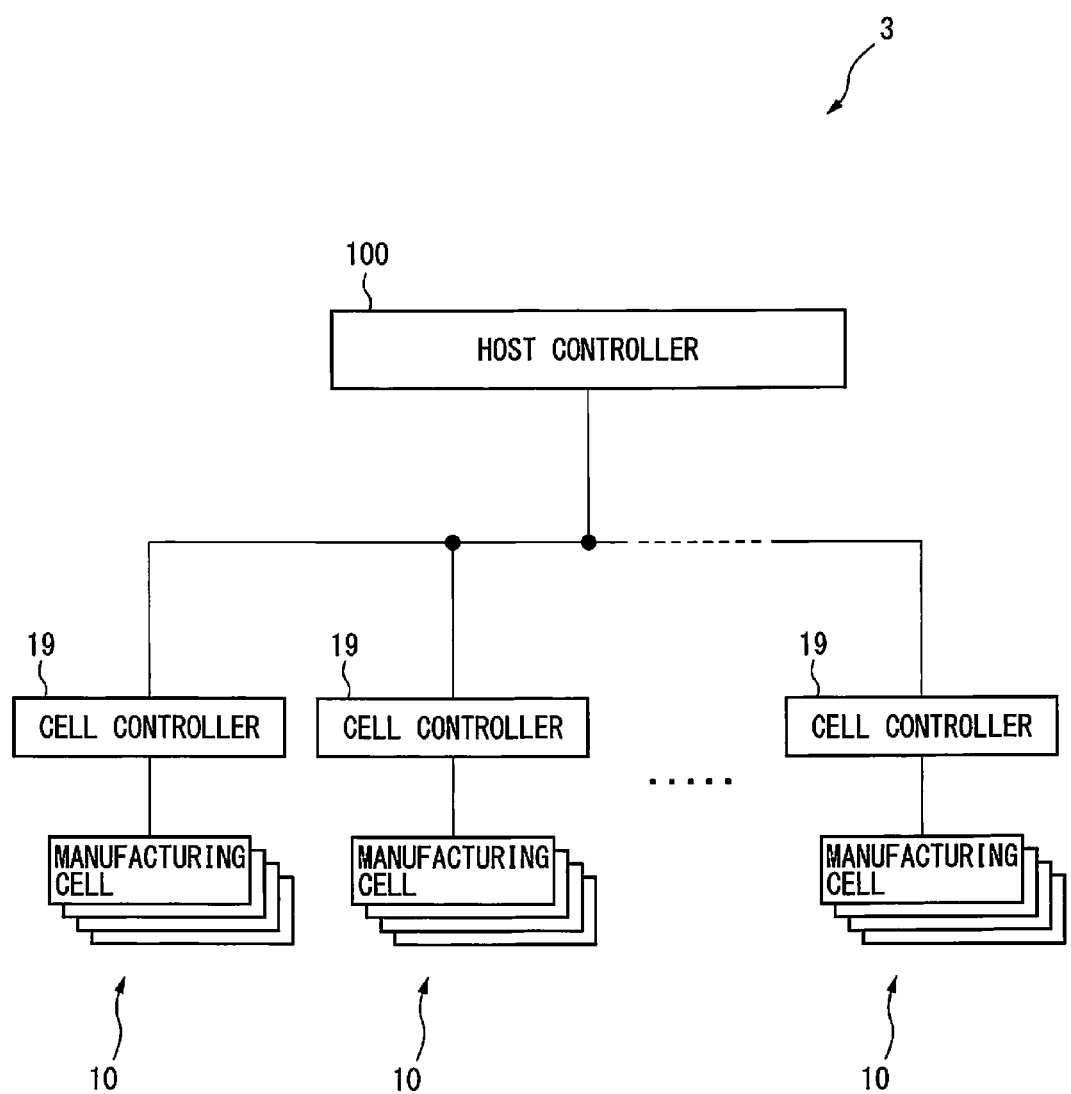
FIG. 7 is a principle block diagram (No. 2) of the machining machine system according to the third embodiment.

Next, a third embodiment will be described. FIGS. 6 and 7 are principle block diagrams of a machining machine system according to the third embodiment. A machining machine system 3 according to the third embodiment is configured as a cell manufacturing system in which at a higher order of the cell controller 19 according to the second embodiment, a host controller 100 is provided. FIG. 6 illustrates an example in which to the host controller 100, one cell controller 19 is communicably connected, and FIG. 7 illustrates an example in which to the host controller 100, the plurality of cell controllers 19 are communicably connected.

The host controller 100 records and manages information on a determination result by the tentative determination unit 14 as acquired by each cell controller 19, information on a determination result by the final determination unit 15 as acquired by each cell controller 19, and a measurement result on an accuracy of a workpiece as machined by each machining machine 11 as acquired by each measurement device 17. Further, the host controller 100 has a function of displaying each information as acquired as well.

The host controller 100 may be disposed, for example, in an office distant from a factory. In such a case, the cell controller 19 and the host controller 100 are communicably connected to each other via a communication device 32, such as network of internet.

In the machining machine system 3, since components other than those as described above are similar to the components as described with reference to FIGS. 1 to 6, identical components are assigned identical reference numerals, and detailed description thereof is omitted.

According to the third embodiment as described above, information on a determination result by the tentative determination unit 14 as acquired by each cell controller 19, information on a determination result by the final determination unit 15 as acquired by each cell controller 19, and a measurement result on an accuracy of a workpiece as machined by each machining machine 11 as acquired by each measurement device 17 can be recorded, managed, and displayed.

Figure 8:
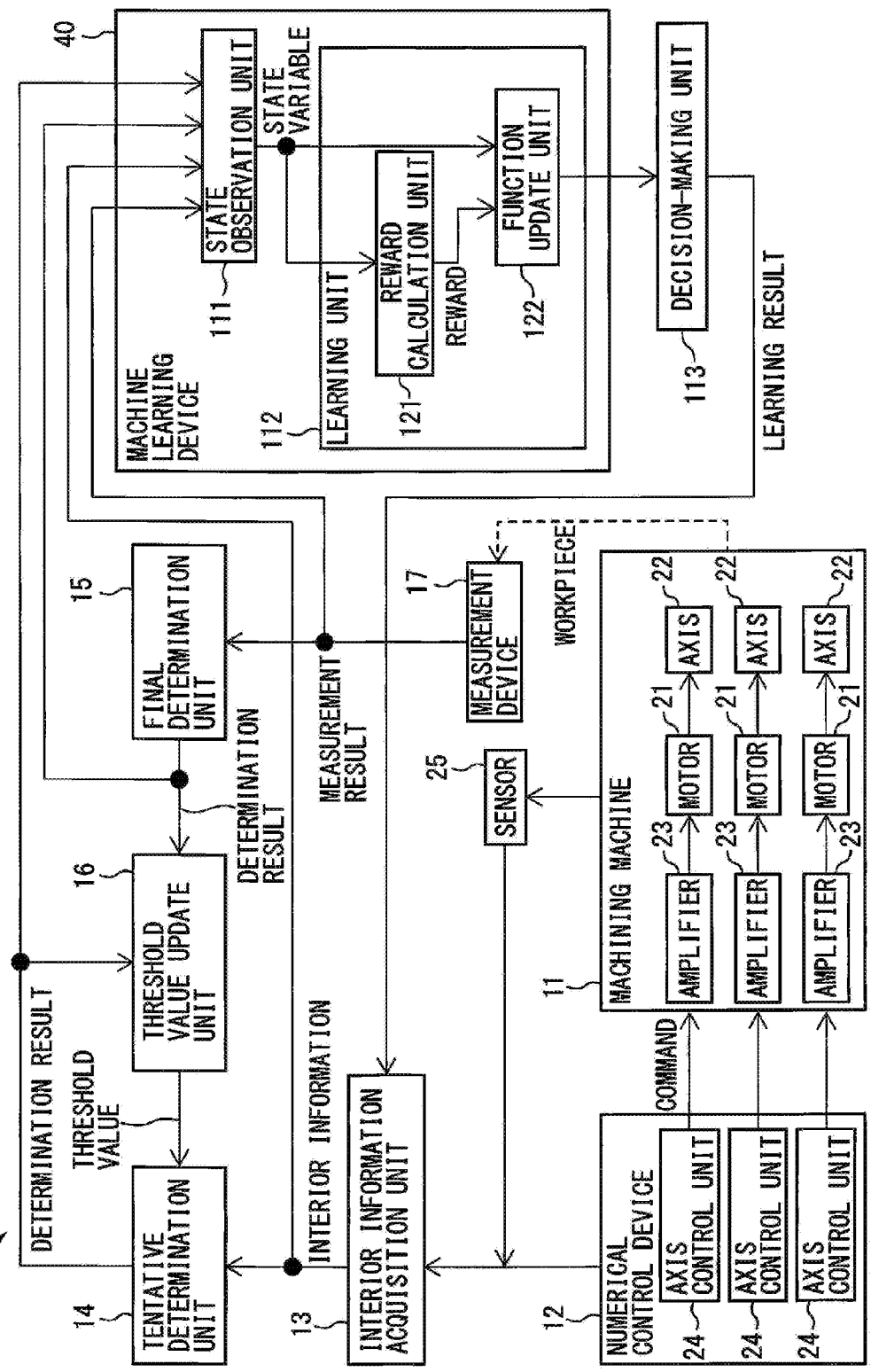
FIG. 8 is a principle block diagram of a machining machine system according to a fourth embodiment.

Next, a fourth embodiment will be described. FIG. 8 is a principle block diagram of a machining machine system according to the fourth embodiment. A machining machine system 4 according to the fourth embodiment is that further including a machine learning device 40 which learns a type of the interior information to be acquired by the interior information acquisition unit 13 in the machining machine system according to the first to third embodiments. The machine learning device 40 according to the fourth embodiment can be applied to any of the first to third embodiments as describe above, but a case in which application is made to the first embodiment will be herein described.

The machining machine system 4 according to the fourth embodiment further includes the machine learning device 40 including a state observation unit 111 and a learning unit 112, and a decision-making unit 113.

The state observation unit 111 observes a state variable configured to include interior information acquired by the interior information acquisition unit 13, a measurement result on an accuracy of a workpiece as machined by the machining machine 11, information on a determination result by the tentative determination unit 14, and information on a determination result by the final determination unit 15. Further, the state variable observed by the state observation unit 111 may include a threshold value set by the threshold value update unit 16 and the machining program.

The learning unit 112 learns interior information to be acquired by the interior information acquisition unit 13 in accordance with a training data set created based on the state variable observed by the state observation unit 111. The learning unit 12 may use any learning algorithm, but the machine learning device 40 has a function of analytically extracting, from a set of data inputted to the device, a useful rule, a knowledge representation, a determination criterion or the like contained therein, outputting a determination result thereof, and performing knowledge learning. In the present embodiment, as the learning algorithm, reinforcement learning is used. The machine learning device 40 is preferably realized by applying, for example, general-purpose computing on graphics processing units (GPGPU), large-scale PC clusters or the like.

The learning unit 112 includes a reward calculation unit 121 and a function update unit 122.

The reward calculation unit 121 calculates a reward based on information on a determination result by the tentative determination unit 14 and information on a determination result by the final determination unit 15.

The function update unit 122 updates a function (action value table) for selecting interior information to be acquired by the interior information acquisition unit 13 based on the state variable observed by the state observation unit 111 and the reward calculated by the reward calculation unit 121. A method for updating the function (action value table) will be described later.

The learning unit 112 may calculate, in a multilayered structure, the state variable observed by the state observation unit 111 and update the function (action value table) in real time. For example, the function update unit 122 may be configured to update the function (action value table) for selecting interior information to be acquired by the interior information acquisition unit 13 based on the state variable observed by the state observation unit 111 and the reward calculated by the reward calculation unit 121 and in accordance with a neural network model. As a method for calculating the state variable in a multilayered structure, for example, a multilayered neural network can be used.

When a determination of acceptance is made by the tentative determination unit 14 and all workpieces which are targets of an accuracy inspection are determined to be accepted by the final determination unit 15, and when a determination of rejection is made by the tentative determination unit 14 and all workpieces which are targets of an accuracy inspection are determined to be rejected by the final determination unit 15, a determination result by the tentative determination unit 14 and a determination result by the final determination unit 15 correspond to each other, and it is meant that interior information as acquired by the interior information acquisition unit 13 for the determination processing by the tentative determination unit 14 is suitable so that the reward calculation unit 121 increases the reward.

On the other hand, when a determination of acceptance is made by the tentative determination unit 14 and workpieces which are targets of an accuracy inspection contain that as rejected by the final determination unit 15, and when a determination of rejection is made by the tentative determination unit 14 and workpieces which are targets of an accuracy inspection contain that as accepted by the final determination unit 15, a determination result by the tentative determination unit 14 and a determination result by the final determination unit 15 do not correspond to each other, and it is meant that interior information as acquired by the interior information acquisition unit 13 for the determination processing by the tentative determination unit 14 is unsuitable so that the reward calculation unit 121 decreases the reward.

The decision-making unit 113 determines interior information to be acquired by the interior information acquisition unit 13 based on a result learned by the above learning unit 112 in accordance with the training data set and in response to an input of the current state variable. The learning result on the interior information to be acquired by the interior information acquisition unit 13 as determined is transmitted to the interior information acquisition unit 13, and the interior information acquisition unit 13 is configured to acquire interior information from the numerical control device 12 based on the learning result. Thus, according to the fourth embodiment, the most efficient interior information to be acquired by the interior information acquisition unit 13 from the numerical control device 12 is automatically learned.

Figure 9:
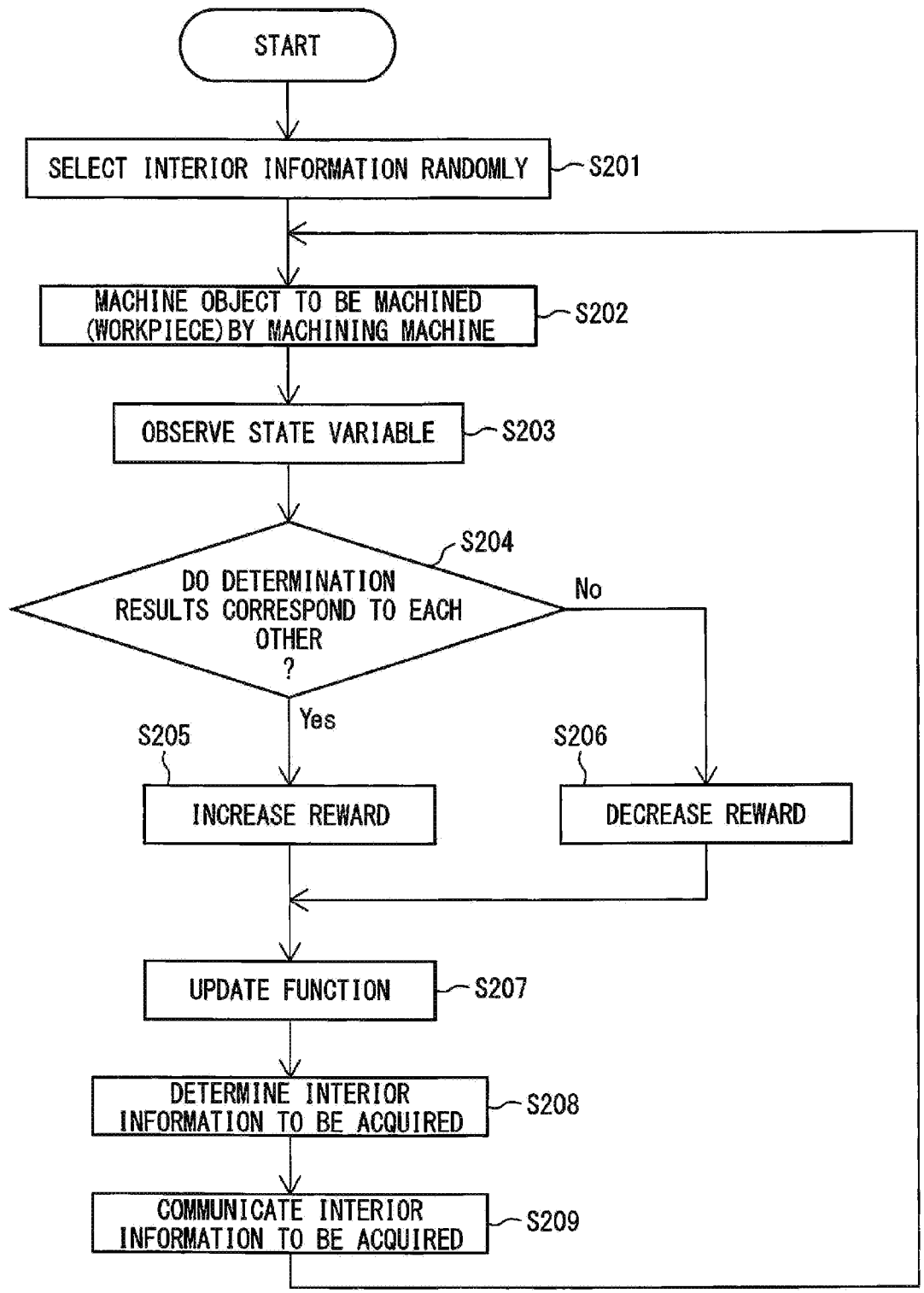
FIG. 9 is a flowchart illustrating an operation flow of machine learning of the machining machine system including a machine learning device to which reinforcement learning is applied according to the fourth embodiment.

FIG. 9 is a flowchart illustrating an operation flow of machine learning of the machining machine system including the machine learning device to which reinforcement learning is applied according to the fourth embodiment.

In general, in reinforcement learning, an initial value of action is randomly selected. In the present embodiment, in step S201, "interior information to be acquired by the interior information acquisition unit 13" which is action is randomly selected.

In step S202, the machining machine 11 machines an object to be machined (workpiece) by driving the motor 21 by supplying power from the amplifier 23 based on a command generated by the numerical control device 12 and by driving the axis 22 to which a tool, an object to be machined (workpiece), or the like is mounted according to purposes. Meanwhile, the interior information acquisition unit 13 acquires current interior information, the measurement device 17 acquires a measurement result on an accuracy of a workpiece as machined by the machining machine 11, the tentative determination unit 14 and the final determination unit 15 each performs the determination processing, and the threshold value update unit 16 performs the threshold value update processing.

In step S203, the state observation unit 111 observes the state variable configured to include interior information acquired by the interior information acquisition unit 13, a measurement result on an accuracy of a workpiece as machined by the machining machine 11, information on a determination result by the tentative determination unit 14, and information on a determination result by the final determination unit 15. Further, the state observation unit 111 may observe, as the state variable, a threshold value set by the threshold value update unit 16 and the machining program.

Next, in step S204, the state observation unit 111 determines whether or not the determination result by the tentative determination unit 14 and the determination result by the final determination unit 15 as observed correspond to each other. When a determination of acceptance is made by the tentative determination unit 14 and all workpieces which are targets of an accuracy inspection are determined to be accepted by the final determination unit 15, and when a determination of rejection is made by the tentative determination unit 14 and all workpieces which are targets of an accuracy inspection are determined to be rejected by the final determination unit 15, the reward calculation unit 121 increases the reward in step S205. On the other hand, when a determination of acceptance is made by the tentative determination unit 14 and workpieces which are targets of an accuracy inspection contain that as rejected by the final determination unit 15, and when a determination of rejection is made by the tentative determination unit 14 and workpieces which are targets of an accuracy inspection contain that as accepted by the final determination unit 15, the reward calculation unit 121 decreases the reward in step S206.

In step S207, the function update unit 122 updates a function (action value table) for selecting interior information to be acquired by the interior information acquisition unit 13 based on the state variable observed by the state observation unit 111 and the reward calculated by the reward calculation unit 121.

In step S208, the decision-making unit 113 selects (determines) interior information to be acquired by the interior information acquisition unit 13 for which the highest reward is obtained, based on the function updated in step S207, and outputs the same. The interior information to be acquired by the interior information acquisition unit 13 as determined by the decision-making unit 113 is communicated to the interior information acquisition unit 13 in step S209.

Then, a return to step S202 is made. Thereafter, processing of steps S202 to S208 is repeatedly performed until the machining machine system 4 stops. Thereby, the machine learning device 40 learns interior information to be acquired by the interior information acquisition unit 13. Note that the training data set may be acquired from motor drive devices, and in such a case, the learning unit 112 repeatedly performs processing of steps S201 to S209 in accordance with the training data set acquired with respect to the plurality of machining machine systems, and learns interior information to be acquired by the interior information acquisition unit 13. When the training data set is acquired with respect to the plurality of machining machine systems, a learning accuracy of the machine learning device 40 is improved. Next, the machine learning device 40 using reinforcement learning will be described further in detail.

Problems of reinforcement learning are set as follows.

The machining machine system observes a state of environment and determines action.

Environment changes according to some rule, and further, one's own action may change the environment.

A reward signal returns each time action is performed.

It is the sum of reward (discount) over the future that is desired to be maximized.

Learning starts from a state in which the result caused by action is not known or only incompletely known. In other words, the machining machine system can acquire the result as data only after it actually operates. In short, it is preferable to explore the optimum action by trial and error.

With a state in which prior learning (a technique, such as supervised learning or inverse reinforcement learning) is performed to mimic a human movement as the initial state, learning may be started from a good starting point.

"Reinforcement learning" is a method for learning appropriate action based on the interaction provided by action to environment not only by determination or sorting but also by learning action, i.e., for learning to maximize the reward obtained in future. This indicates that in the present embodiment, action such as affecting the future, for example, optimization of interior information acquired by the interior information acquisition unit 13, can be acquired. For example, description is continued with respect to the case of Q-learning, but there is no limitation thereto.

Q-learning is a method for learning a value Q(s, a) that selects action a in some environmental state s. In other words, when there is some state s, the highest action a of the value Q(s,a) may be selected as the optimum action. However, first, the correct value for the value Q(s, a) is completely not known for a combination of the state s and the action a. Accordingly, an agent (action subject) selects various actions a under some state s and is given a reward for the action a at that time. In this case, the agent selects a better action, i.e., proceeds to learn the correction value Q(s, a).

Further, as a result of action, it is desired to maximize the sum of the reward obtained in future, and finally, it is aimed to make Q(s, a)=E[Σγ$^t$r$_t$]. Herein, the expected value is taken for the case when the state varies in accordance with the optimum action, and since it is not known, it is preferable to learn while making exploration). An update formula for such value Q(s, a) can, for example, be represented by equation (1) as follows:

$$Q(s_t, a_t) \leftarrow Q(s_t, a_t) + \alpha\left(r_{t+1} + \gamma \max_a Q(S_{t+1}, a) - Q(s_t, a_t)\right) \quad (1)$$

In the above equation (1), $s_t$ represents a state of the environment at a time t, and $a_t$ represents an action at the time t. The action $a_t$ changes the state to $s_{t+1}$. $r_{t+1}$ represents a reward that can be gained via the change of the state. Further, the term with max is the Q-value multiplied by γ for the case where the action a for the highest Q-value known at that time is selected under the state $s_{t+1}$. γ is a parameter of 0<γ≤1, and referred to as discount rate. α is a learning factor, which is in the range of 0<α≤1.

Equation (1) represents a method for updating the evaluation value $Q(s_t, a_t)$ of the action $a_t$ in the state $s_t$ on the basis of the reward $r_{t+1}$ has returned as a result of the action $a_t$. It indicates that when the evaluation value $Q(s_{t+1}, \max a_{t+1})$ of the best action max a in the next state based on reward $r_{t+1}$+action a is larger than the evaluation value $Q(s_t, a_t)$ of the action a in the state s, $Q(s_t, a_t)$ is increased, whereas when smaller, $Q(s_t, a_t)$ is also decreased. In other words, it is configured such that the value of some action in some state is made to be closer to the reward that instantly come backs as a result and to the value of the best action in the next state based on that action.

Methods of representing Q(s, a) on a computer includes a method in which the value is retained as a table (action value table) for all state-action pairs (s, a) and a method in which a function approximate to Q(s, a) is prepared. In the latter method, the above-described update formula can be implemented by adjusting parameters of the approximation function by a technique, such as stochastic gradient descent method. The approximation function may use a neural network described hereinafter.

Figure 10:
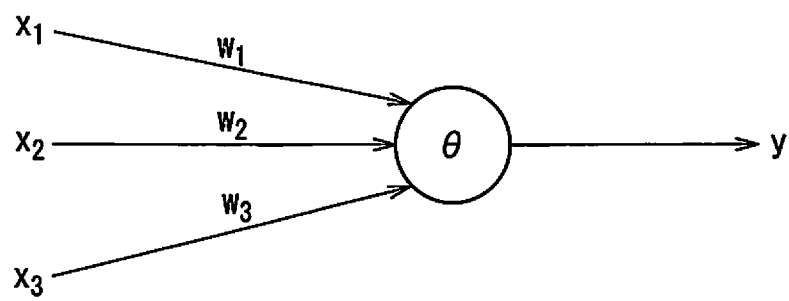
FIG. 10 is a schematic diagram illustrating a model of a neuron.

Further, as an approximation algorithm for the value function in reinforcement learning, use may be made of a neural network. The neural network is configured, for example, of an arithmetic unit, a memory, or the like that implements a neural network imitating a model of neuron such as illustrated in FIG. 10. FIG. 10 is a schematic diagram illustrating the model of neuron.

As illustrated in FIG. 10, the neuron outputs an output y for inputs x (in the drawing, by way of example herein, input x1 to input x3). Each of the inputs x1 to x3 is multiplied by a weight w (w1 to w3) corresponding to the input x. In this case, the neuron outputs the output y represented by equation (2). The input x, the output y, and the weight w all are vectors. Further, in the below equation (2), θ is a bias, and $f_k$ is an activation function.

$$y = f_k(\Sigma_{i=1}^n x_i w_i - \theta) \quad (2)$$

In the fourth embodiment as described above, the machine learning device 40 is applied to the first embodiment, but may be applied to both the second and third embodiments. For example, application is made to the second embodiment, the machine learning device 40 may be provided to the cell controller 19, and when application is made to the third embodiment, the machine learning device 40 may be provided to the cell controller 19 or the host controller 100.

Note that the state observation unit 111, the learning unit 112, and the decision-making unit 113 as described above may be constructed using a software program format or using a combination of various types of electronic circuits and a software program. For example, when these are constructed using a software program format, a calculation processing device for operating in accordance with the software program is provided, and the software program is operated on a crowd server, whereby a function of each unit as described above can be realized. Further, alternatively, the machine learning device 40 including the state observation unit 111 and the learning unit 112 may be realized as a semiconductor integrated circuit in which a software program which realizes a function of each unit is written. Still further, alternatively, a semiconductor integrated circuit including not only the machine learning device 40 including the state observation unit 111 and the learning unit 112 but also the decision-making unit 113 in which a software program which realizes a function of each unit is written may be realized.

According to the present invention, the machining machine system capable of preventing a failure to detect rejects while reducing the number of workpieces which are targets of an accuracy inspection can be realized.

What is claimed is:

1. A machining machine system comprising:
a machining machine machines a workpiece by driving an axis by at least one motor;
a numerical control device which generates a command for driving the axis of the machining machine based on a machining program;
an interior information acquisition unit which acquires interior information of the numerical control device;
a tentative determination unit which determines acceptance/rejection of a workpiece as machined by the machining machine based on a comparison result between the interior information acquired by the interior information acquisition unit and a threshold value;
a final determination unit which determines acceptance/rejection of workpieces which are targets of an accuracy inspection which include at least a workpiece as determined to be accepted/rejected by the tentative determination unit based on a measurement result with respect to an accuracy of the workpiece; and
a threshold value update unit which updates the threshold value used for determination processing by the tentative determination unit based on a determination result by the tentative determination unit and a determination result by the final determination unit,
wherein the threshold value update unit sets:
a value obtained by multiplying the threshold value as already set by a first coefficient smaller than one and larger than zero is set as the new threshold value when a determination of acceptance is made by the tentative determination unit and all the workpieces which are targets of an accuracy inspection are determined to be accepted by the final determination unit;
a value obtained by multiplying the threshold value as already set by a second coefficient smaller than the first coefficient and larger than zero is set as the new threshold value when a determination of acceptance is made by the tentative determination unit and the workpieces which are targets of an accuracy inspection contain that as rejected by the final determination unit;
a value obtained by multiplying the threshold value as already set by a third coefficient larger than one is set as the new threshold value when a determination of rejection is made by the tentative determination unit and the workpieces which are targets of an accuracy inspection contain that as accepted by the final determination unit; and
the threshold value as already set is maintained when a determination of rejection is made by the tentative determination unit and all the workpieces which are targets of an accuracy inspection are determined to be rejected by the final determination unit.

2. The machining machine system according to claim 1, further comprising a measurement device which measures an accuracy of at least a machined shape or a machined surface of a workpiece as machined by the machining machine.

3. The machining machine system according to claim 2, further comprising:
a communication network which connects sets of manufacturing cells, each set being composed of the machining machine and the numerical control device provided to correspond to the machining machine and at least one of the measurement devices in a manner communicable with each other therebetween; and a cell controller which is communicably connected to the communication network and controls an operation of each manufacturing cell, wherein the interior information acquisition unit, the tentative determination unit, the final determination unit, and the threshold value update unit are disposed in the cell controller.

4. The machining machine system according to claim 3, further comprising a host controller which is communicably connected to the plurality of cell controllers, and records and manages information on a determination result by the tentative determination unit as acquired by each of the cell controllers, information on a determination result by the final determination unit as acquired by each of the cell controllers, and a measurement result on an accuracy of a workpiece as machined by the machining machine as acquired by the measurement device.

5. The machining machine system according to claim 1, wherein the machining machine is a machine which machines a workpiece by driving a rotational axis and a linear axis by the motor, and the interior information includes information on a position deviation which is a difference between a position command to the linear axis and a measured position of the linear axis.

6. The machining machine system according to claim 1, wherein the machining machine is a machine which machines a workpiece by driving rotational axes and linear axes by the motor, and the interior information includes information on a position deviation of a tool which is a difference between a position command based on the machining program to the tool provided for the rotational axes and the linear axes and a measured position with respect to a position of the tool.

7. The machining machine system according to claim 1, wherein the threshold value used for the determination processing by the tentative determination unit is set for each of machining target areas of a workpiece machined by the machining machine.

8. The machining machine system according to claim 1, wherein the interior information includes data obtained by subjecting, to second order integration, high frequency components extracted by allowing a command having a dimension of acceleration generated by the numerical control device to pass through a high pass filter.

9. The machining machine system according to claim 1, wherein the interior information includes data correlated with information acquired by a sensor provided to the machining machine and a machining position or a machining time.

10. The machining machine system according to claim 1, further comprising a machine learning device including a state observation unit which observes a state variable configured to include interior information acquired by the interior information acquisition unit, a measurement result on an accuracy of a workpiece as machined by the machining machine, information on a determination result by the tentative determination unit, and information on a determination result by the final determination unit, and a learning unit which learns interior information to be acquired by the interior information acquisition unit in accordance with a training data set created based on the state variable.

11. The machining machine system according to claim 10, wherein as the state variable observed by the state observation unit, a threshold value set by the threshold value update unit and the machining program are further included.

12. The machining machine system according to claim 10, further comprising a decision-making unit which determines interior information to be acquired by the interior information acquisition unit based on a result learned by the learning unit in accordance with a training data set and in response to an input of the current state variable.

13. The machining machine system according to claim 10, wherein the learning unit includes:

a reward calculation unit which calculates a reward based on information on a determination result by the tentative determination unit and information on a determination result by the final determination unit, and a function update unit which updates a function for selecting interior information to be acquired by the interior information acquisition unit based on the state variable and the reward.

14. The machining machine system according to claim 13, wherein the reward calculation unit increases the reward when a determination of acceptance is made by the tentative determination unit and all workpieces which are targets of an accuracy inspection are determined to be accepted by the final determination unit, and when a determination of rejection is made by the tentative determination unit and all workpieces which are targets of an accuracy inspection are determined to be rejected by the final determination unit, and decreases the reward when a determination of acceptance is made by the tentative determination unit and workpieces which are targets of an accuracy inspection contain that as rejected by the final determination unit, and when a determination of rejection is made by the tentative determination unit and workpieces which are targets of an accuracy inspection contain that as accepted by the final determination unit.

* * * * *